United States Patent [19]

Rinelli

[11] Patent Number: 5,038,868
[45] Date of Patent: Aug. 13, 1991

[54] GROUND CULTIVATOR

[76] Inventor: Richard Rinelli, 1585 SE Saxony St., Port St. Lucie, Fla. 33452

[21] Appl. No.: 520,370

[22] Filed: May 7, 1990

[51] Int. Cl.$^5$ .................. A01B 33/02; A01B 33/16
[52] U.S. Cl. .................................... 172/48; 172/78; 172/120; 172/123
[58] Field of Search .............. 172/19, 21, 48, 51, 172/52, 76, 77, 78, 520, 634, 118, 120, 122, 123, 125; 56/6, 10.8

[56] References Cited

U.S. PATENT DOCUMENTS

| | | | |
|---|---|---|---|
| 1,740,321 | 12/1929 | Vasconcellos | 172/78 |
| 2,273,120 | 2/1942 | Lindskog | 172/21 |
| 2,612,094 | 9/1952 | Drozinski | 172/48 |
| 2,688,832 | 9/1954 | Gordon | 172/77 |
| 2,691,933 | 9/1954 | Emerson | 172/76 |
| 3,128,831 | 4/1964 | Arndt | 172/48 |
| 3,133,598 | 5/1964 | Caldwell | 172/125 |
| 3,490,541 | 1/1970 | Adams | 172/48 |
| 3,705,628 | 12/1972 | King | 172/68 |
| 4,520,873 | 6/1985 | Gefen | 172/123 |

FOREIGN PATENT DOCUMENTS

| | | | |
|---|---|---|---|
| 141676 | 6/1951 | Australia | 172/48 |
| 9813 | 11/1956 | Fed. Rep. of Germany | 172/78 |

OTHER PUBLICATIONS

Howard Rotavator Co., Turf Quaker Flyer, 1/16/81.

Primary Examiner—Dennis L. Taylor
Assistant Examiner—Spencer Warnick
Attorney, Agent, or Firm—Malin, Haley, McHale, DiMaggio & Crosby

[57] ABSTRACT

A cultivation implement which is comprised generally of forward and rear thatching reels which rotate in opposite directions relative to each other under positive drive power from a tow vehicle, such as a tractor. Each reel unit is rotatably disposed in its own carriage or frame, which carriages are hingedly connected to each other and to said tow vehicle. Each carriage rides, when the implement is not in use, on free spinning road wheels. For use, each carriage may be selectively lowered from the non-use, raised, position to a lowered, in-use, position, by actuation of hydraulic means. To assure even and smooth operation of the implement while the reel units are engaging the ground, unique ground engaging members, or skids, are connected to each carriage and positioned relative to each said reel unit so as to be interengaged by the vertical blade members.

6 Claims, 8 Drawing Sheets

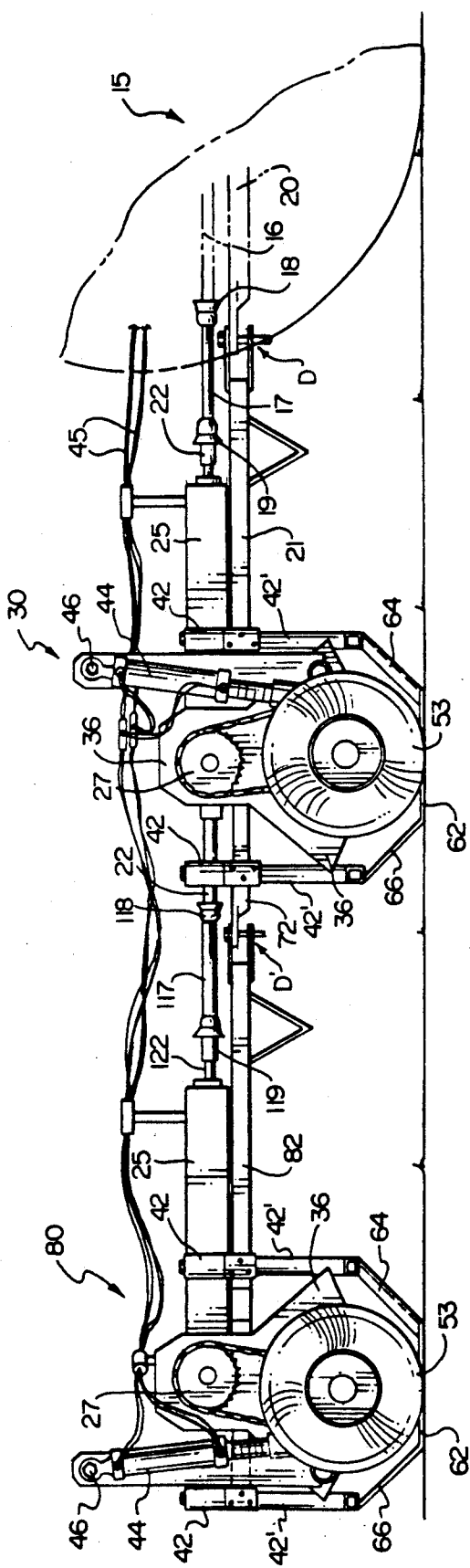
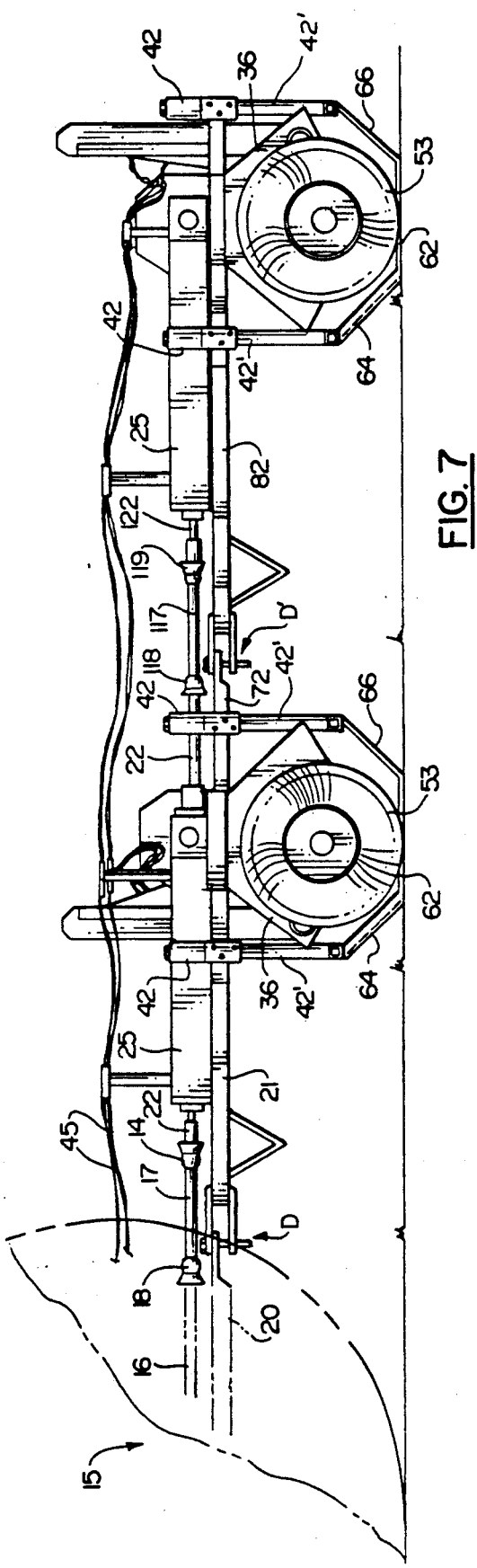

GROUND CULTIVATOR

BACKGROUND OF THE INVENTION

1. Field of the Invention

The instant invention relates to ground cultivators and more particularly relates to a towed implement for thatching grass covered terrain.

2. Prior Art

In the manicure and grooming of large tracts of grass covered land, it has become a primary object of most practitioners to remove dead grass residues from the lawn so as to improve the health of the lawn. Particularly in the case of large areas of park land and golf courses where ground undulations are present, an implement which can perform the thatching operation uniformly thereover is needed. Such an implement must not only follow the contour of the terrain evenly, but it must also have the capability of operating nimbly around immovable objects such as trees and rocks.

Numerous attempts have been made in the past to provide tractor-pulled implements for cultivating which utilize reel-type operators powered by the engine of the tow vehicle. Representative examples are shown in U.S. Pat. No. 3,705,628 to King and in U.S. Pat. No. 3,128,831 to Arndt. King discloses a cultivator implement which employs a single cultivator wheel, which wheel rides directly on the ground being treated. Arndt discloses a cultivator employing a pair of unidirectional cultivating wheels rotatably connected to a single carriage. These inventions, however, lack the flexibility and agility to perform cultivating operations with the degree of precision required of today's park and golf course caretakers.

SUMMARY OF THE INVENTION

To accomplish this, it is proposed by the inventor herein to employ a cultivation implement which is comprised generally of forward and rear thatching reels which rotate in opposite directions relative to each other under positive drive power from a tow vehicle, such as a tractor. Each reel unit is rotatably disposed in its own carriage or frame, which carriages are hingedly connected to each other and to the tow vehicle. Each carriage rides, when the implement is not in use, on free spinning road wheels. For use, each carriage may be selectively lowered from the non-use, raised, position to a lowered, in-use, position, by actuation of hydraulic means.

Each reel unit has a plurality of spaced apart parallel coaxial vertical blades. Each blade has a plurality of spokes connected to a common hub which rotate on a common axis. The spokes of each successive blade are preferably offset so as to form either a helical or random pattern when viewed in perspective.

Each carriage may be lowered to ride along the ground so that road wheels are disengaged with or simply roll along the ground. To assure even and smooth operation of the implement while the reel units are engaging the ground, unique ground engaging members, or skids, are connected to each carriage and positioned relative to each said reel unit so as to be interengaged by the vertical blade members.

It can therefore be seen that a principal object of the instant invention is to provide a cultivation implement of the positively driven vertical blade variety so constructed and arranged as to closely follow the contour of the terrain to evenly treat the same.

It is a further object of the instant invention to provide such an implement which is easily manipulated around obstructions.

It is an even further object of the instant invention to provide such an implement which is large enough to reduce work time by treating a large swath with each pass.

It is a still further object of the instant invention to provide a cultivation implement having a pair of oppositely spinning, parallel vertical blade members so as to obtain a bidirectional treatment of the surface being treated with a single pass of said implement thereover.

It is a still further object of the instant invention to provide such an implement which is simple to operate from a tow vehicle.

In accordance with these and other objects which will be apparent hereinafter, the instant invention will now be described with particular reference to the accompanying drawings.

BRIEF DESCRIPTION OF THE DRAWINGS

FIG. 6 is a right side elevational view of the invention showing both forward carriage (30) and rear carriage (60) in the in-use position.

FIG. 7 is a left side elevational view of the invention shown in FIG. 1.

DETAILED DESCRIPTION OF THE PREFERRED EMBODIMENT

Figure 1:
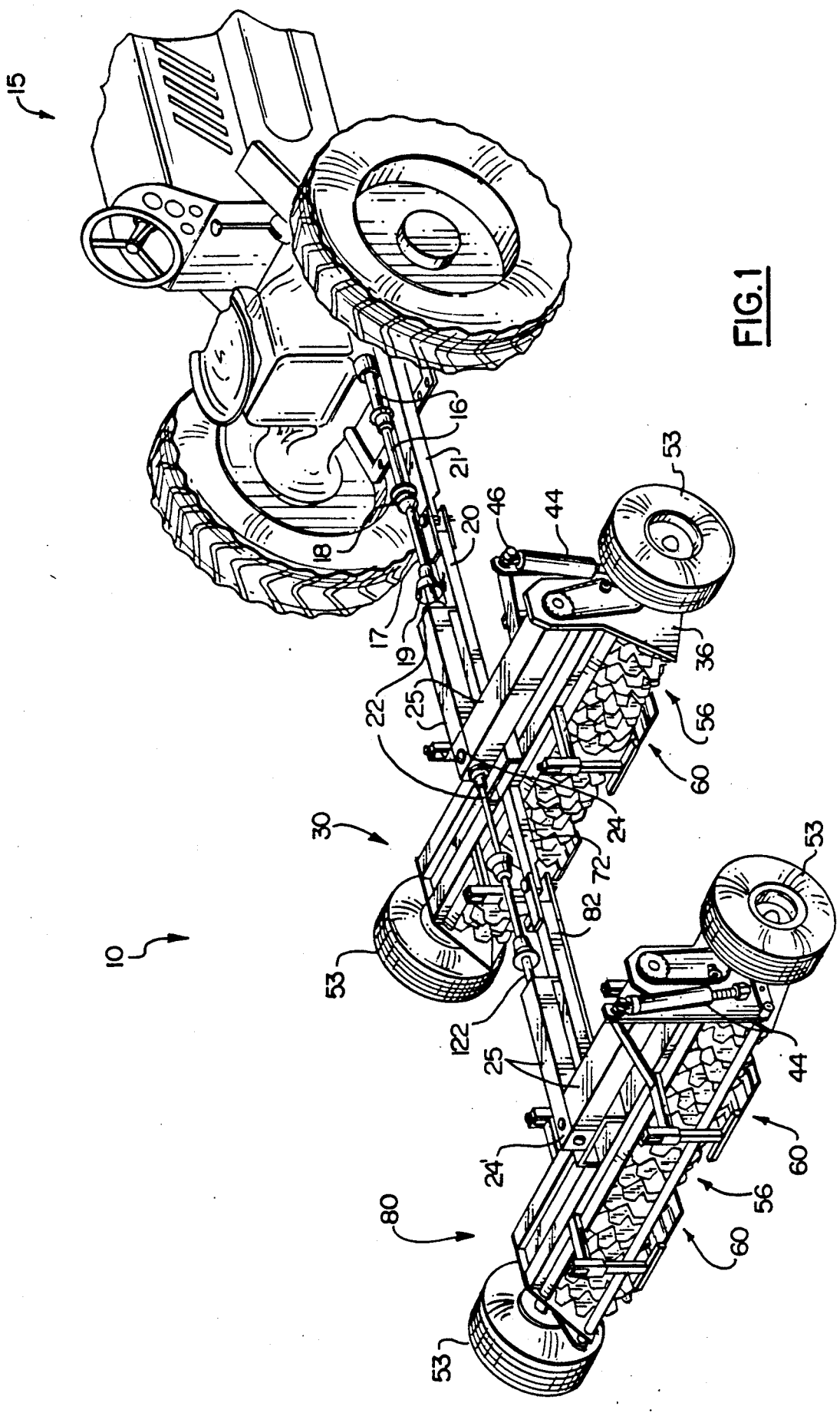
FIG. 1 is a perspective view of the invention connected to a representative tow vehicle.
Figure 3:
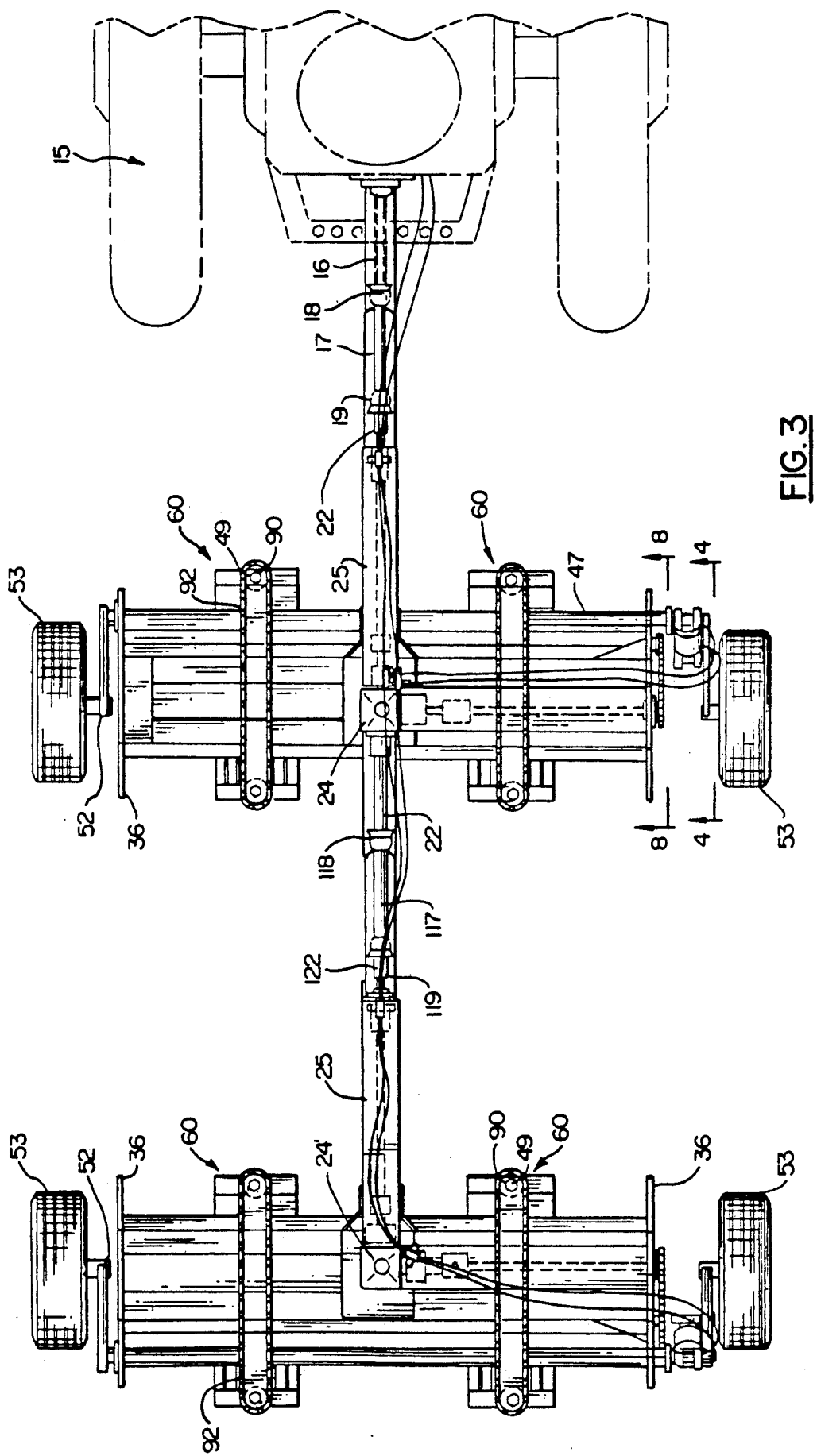
FIG. 3 is a plan view of the invention shown in FIG. 1.

As best seen in FIGS. 1 and 3, the implement 10 is comprised generally of a pair of thatching reels 56, which rotate in opposite directions relative to each other, thereby treating the ground in two directions with each pass of the implement 10 and throwing thatched material toward each other under positive drive power from tow vehicle 15 in a conventional manner. Each of the pair of reel units 56 are rotatably disposed in respective spaced forward and rear carriages 30 and 80, which carriages are hingedly linked by an interconnection between forward carriage trailing link 72 and rear carriage link 82. Both carriage 30 and 80 ride, when the implement 10 is not in use, on free-spinning wheels 53. Further, each carriage 30 and 80 may be selectively lowered from the non-use, raised, position to a lowered, in-use, position via actuation of hydraulic ram 44, in a manner to be specified hereafter.

Shown in FIG. 1 is a perspective view of the implement 10 of the instant invention functionally connected to a tow vehicle such as tractor 15 by way of power transfer shaft 16 and tractor tow link 21. A forward tow link 20 hingedly connects forward reel carriage or frame 30 to tractor tow link 21.

The specific structure and configuration of the implement 10 will now be described with particular reference to the structure and operation of the forward carriage 30. However, it is to be understood that in both structure and operation, rear carriage or frame 80 is identical to forward carriage 30 with specific exceptions which will be clearly addressed.

In operation, power from the output of the tractor motor is provided to the implement 10 through power transfer shaft 16, then through universal joint 18 to intermediate shaft 17. Intermediate shaft 17 is connected t forward carriage 30 through shaft 22 by universal joint 19. Shaft 22 passes into drive shaft housing 25 and connects to forward gear box 24, where rotation of shaft 22 is transferred to rotation of transverse shaft 23 which connects at its distal end to sprocket or drive gear 27. Shaft housing 25 also preferably covers transverse shaft 23. Transverse shaft 23 extends from forward gear box 24 through side frame panel 36 to drive gear 27 on the outboard side of side frame panel 36.

Figure 8:
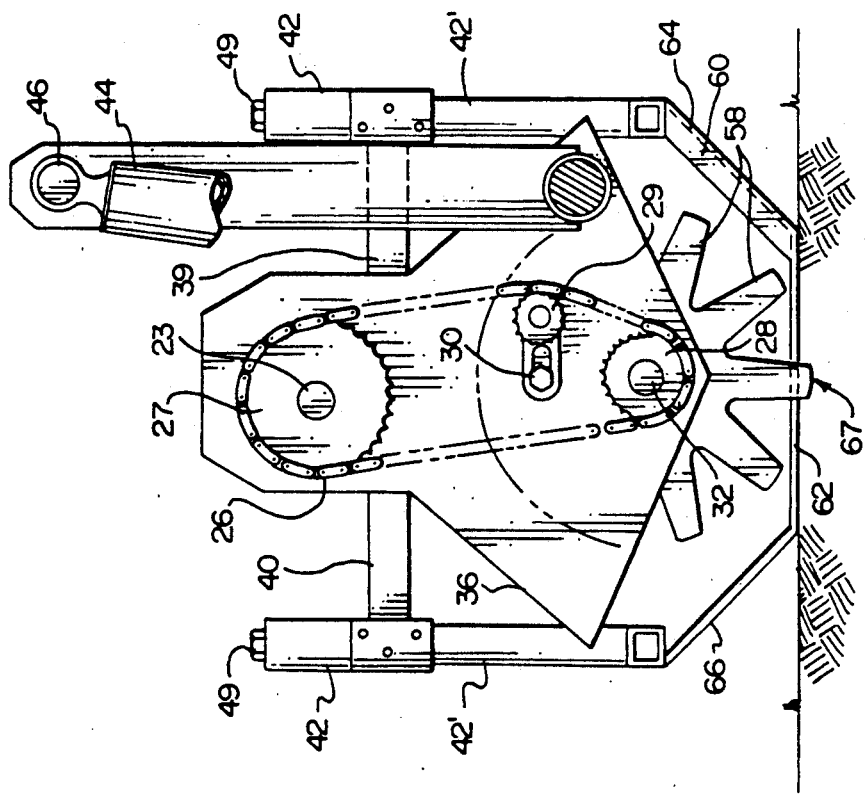
FIG. 8 is a side elevational view taken along lines 8—8 of FIG. 3.

As best shown in FIG. 8, drive chain 26 connects drive gear 27 to gear 28 and idler or tensioner sprocket 29. Sprocket 29 is adjustable by way of tensioner adjustment means 30 to adjust the tension of drive chain 26. Gear 28 is connected to drive axle 32 of forward reel 56 which is supported by appropriate bearings B disposed of within carriage side frame members 36.

Spaced along and rigidly attached to drive axle 32 are a plurality of cutting or thatching blades 57 for thatching the ground over which implement 10 passes while in operation. Each of these blades 57 comprises a plurality of spoke-like projections 58 from a central hub 59 (not shown) connected to drive axle 32. Each blade 57 is, preferably, aligned along drive axle 32 so that the projecting spokes 58 along reel 56 are offset from one another to follow either a helical or a random pattern along drive axle 32 between side frame panels 36. This manner of aligning reels 56 provides for a more even cultivation as implement 10 is used than if the spokes were consecutively aligned along drive shaft 32.

Figure 2:
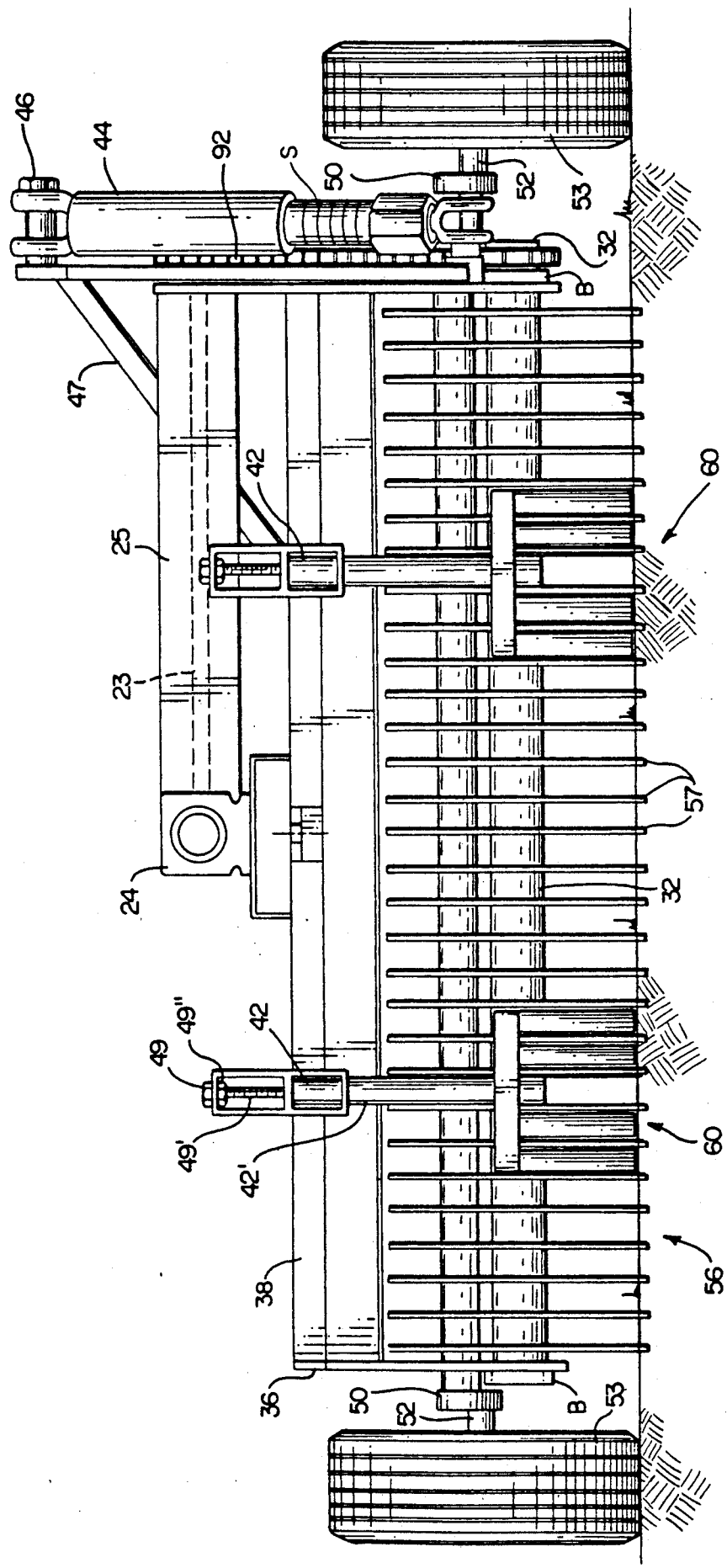
FIG. 2 is a rear elevational view of the rear carriage of the invention shown in FIG. 1.
Figure 9:
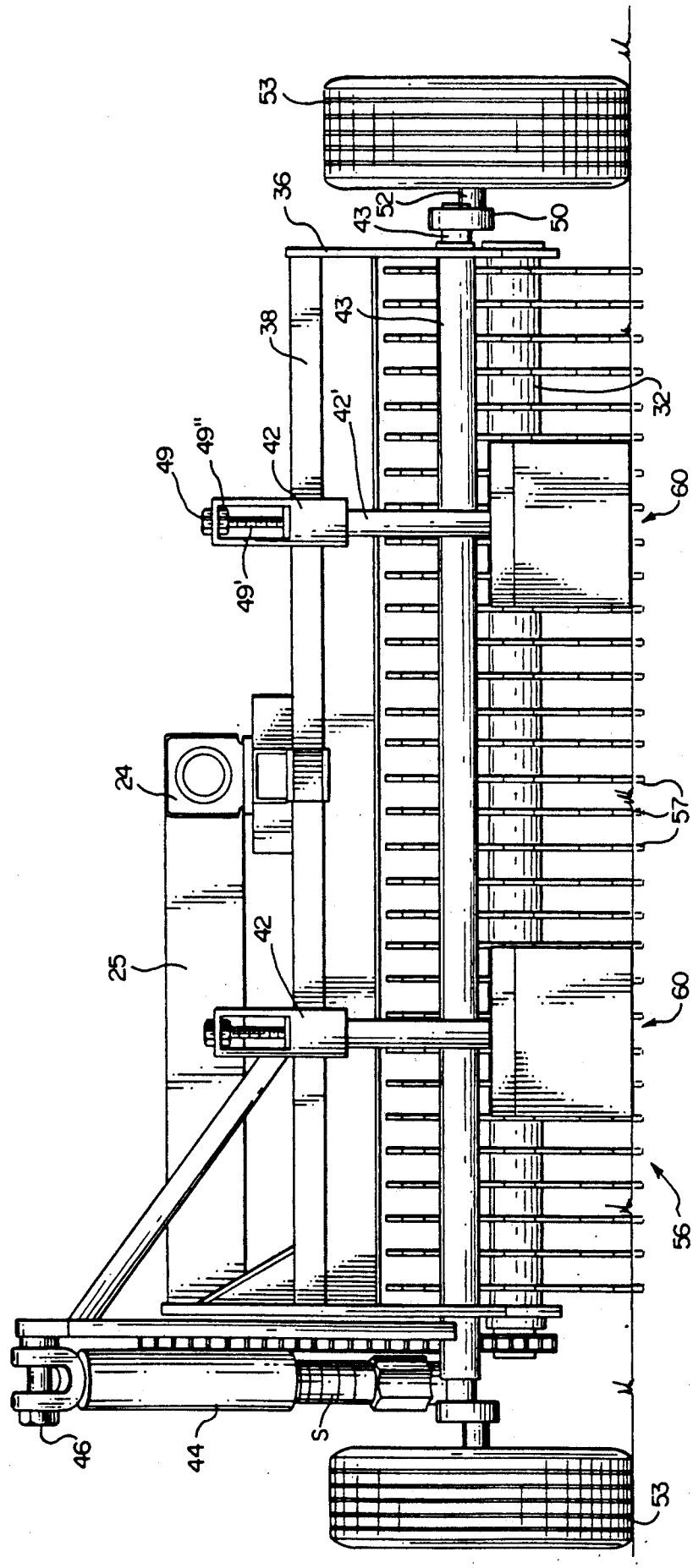
FIG. 9 is a front elevational view of forward carriage shown detached from the tow vehicle.

Disposed between side frame panels 36 at the bottom of each carriage are a pair of skids 60. As best seen in FIGS. 2, 8 and 9, skids 60 are rigidly, but adjustably connected to upper transverse frame reels 38 of carriages 30 and 80 via forward and rear skid struts 39 and 40, respectively, which in turn are connected to skid support rails 42. In the preferred embodiment, skids 60 are vertically adjustable relative to carriages 30 and 80 so as to adjust the depth of cut caused by blades 57. To this end, skid supports rails 42 may be broken up into relatively movable upper and lower telescoping segments 42 and 42', respectively. Vertical adjustment may be carried out by means of various adjustment means, and in the embodiment herein disclosed said skid height adjustment means is comprised of an internally threaded nut 49 and an externally threaded bar stop 49'. Rotation of nut 49, which is rigidly connected to bar stop 49' causes said bar stop 49' to rotate within internally threaded nut 49", which nut 49" is rigidly connected to upper skid support rail portion 42, which in turn causes the lowermost end of bar 49' to bear down on the uppermost end of lower skid support rail 42'. Manipulation of all four skid support rails for each carriage 30 and 80 results in a uniform raising or lowering of said carriages. This manipulation may be carried out, as shown in FIG. 3, by connecting a sprocket 90 to each of nuts 49 and then connecting a chain 92 there across. Automatic means (not shown) may be employed for turning the sprocket 90 and chain 92 arrangements from the operator's seat on two vehicle 15. Each of skids 60 includes a ground contact plate 62 which is positionable relative to the ground as will be described hereafter. Skid plate/blade interengagement cutouts 67 are provided in skid ground contact plates 6 corresponding to the path of the spokes 58 of blades 57 so that said spokes 58 are free to pass through said cutouts 67 to engage the ground when skid ground contact plate 62 is in contact with the ground. The placement of the skids in this manner ensures that the reels 56 will follow the contour of the terrain accurately because the skids 60 contact the ground coincident with the line of contact which blades 57 mate with the ground.

Forward of and connected to skid ground contact plate 62 is skid front sled member 64. Front sled member 64 is curved upward from ground contact plate 62 and preferably has rounded rigid edges to assist in smooth dragging of carriages 30 and 80 over the ground. Because spokes 58 of reel 56 extend through cutouts 67 in skid contact plate 62, and because skid contact plate 62 rests upon the ground, the interaction of said spokes 58 with the ground will exactly follow the contour of the ground. This is an improvement over the prior art devices which have skid plates or the like displaced from the thatching means ground contact line, which leads to an uneven thatching in uneven terrain. Skid trailing member 66 is attached to the rear of ground contact plate 62 to provide a continuous rigid unit consisting of a front sled member 64, ground contact plate 62, and skid trailing member 66.

As previously mentioned, the implement 10 rides when not in use on free spinning wheels 53. In order to place the implement 10 into its functional or lowered position, wheels 53 must be raised relative to implement 10 so that skid ground contact plate 62 comes in contact with the ground. This is done by means of a hydraulic ram 44 which is rigidly attached at its upper end to hydraulic ram lift support 46 on forward reel carriage 30 and at the other end to lift link 50. Lift link 50 is attached at one end to rotatable wheel spindle 52 which is the axle for wheel 53, and at the other end to axle 43 which extends through the front of forward carriage 30 through side frame panels 36 to a corresponding rotatable link 50 outside frame panel 36 on the opposite side of forward reel carriage 30. The corresponding link 50 also terminates in wheel spindle 52 which provides the axle for the corresponding wheel 53. Ram 44 is pivotally connected to link 50 at a point between axle 43 and spindle 52. In addition, ram 44 is pivotally connected at its opposite end to forward reel carriage 30.

Hydraulic fluid under pressure may be diverted at the operator's option through upper and lower hydraulic lines 45 into ram 44. Hydraulic pressure in ram 44 causes ram 44 to expand or contract depending upon whether said fluid is introduced above or below internal ram piston (not shown). Introducing pressurized fluid into upper line (A) causes ram piston (not shown) to move downwardly thus exerting downward force on link 50, rotating link 50 around axle 43, thereby lowering wheel 53. To raise wheel 53, hydraulic pressure is introduced through line C into ram 44 thereby raising wheels 53 and allowing forward carriage 30 to be lowered to the ground. This has the effect of raising wheel 53 relative to forward reel carriage 30 until skid plate 62 comes into contact with the ground. It is also possible to provide a ram 44 which employs a coil-over spring arrangement in concentric relation therewith to replace lower hydraulic line C. Such a coil-over spring arrangement may employ a spring with a spring rate sufficient to maintain a slight downward force on wheels 53 via axle 43 and links 50 to assist the device in maintaining traction while being operated transversely on slopes.

Rear reel carriage 80 is constructed and arranged in a near identical manner to forward reel carriage 30 with the following exceptions: through-shaft 122 does not extend through rear gear box 24', and, the gearing in gear box 24' is selected so that reel 56 in forward carriage 30 rotate in the opposite direction to reel 56 in rear carriage 80. Further, as best shown in FIG. 6, the rear carriage is turned 180 degrees relative to forward carriage 30 as to all of the substantial components with the exception of skids 60 being oriented identically to skids 60 on forward carriage 30. Further, the chain and sprocket drive arrangement and ram/rotatable link 50 arrangement connected to rear carriage 80 is on the same side of implement 10 as comparable elements on forward carriage 30. In other principal respects, rear reel carriage 80 is identical in structure and function to forward reel carriage 30.

Rear reel carriage 80 is attached to forward reel carriage 30 by means of rear tow link 82 which is hingedly connected to forward reel carriage 30 by means of forward reel carriage tow link 72. It should be noted that the distance from the hinge connecting point D of tractor tow link 21 and forward tow link 20 to a central point between wheels 53 placed on opposite sides of forward reel carriage 30 is preferably equivalent to the length between connecting point of forward reel carriage tow link 72 and rear tow link 82 to a point midway between wheels 53 on rear reel carriage 80. This configuration allows for rear reel carriage 80 to exactly track forward reel carriage 30 through any turns that may be initiated by the tractor 15. Since forward reel carriage 30 and rear reel carriage 80 have reels which move in opposite directions as will be explained hereafter, the provision for rear reel carriage 80 to follow exactly in the track of forward reel carriage 30 provides that the ground will be thoroughly cultivated by the interaction of both reels moving in opposite directions and eliminate the need to make two passes, in opposite directions, over the same swatch of ground. This results in obvious and substantial savings of time and fuel.

In operation, the device is brought to the area of ground to be cultivated by towing the implement 10 behind tractor 15 with wheels 53 extended downward so that skid 60 and reels 56 are raised above the ground. When it is desired that the cultivation shall begin, hydraulic pressure is introuduced via hydraulic line C into ram 44 below the piston therein so that wheels 53 will move upward relative to carriages 30 and 80 and thus to skid plate 60 until skid plate 60 comes in contact with the ground. At this time, tractor output shaft 16 is engaged to a power take-off means on tractor 15 so that tractor output shaft 16 begins to rotate. This rotational motion is carried through universal joint 18 through intermediate shaft 17 and through universal joint 19 to forward through-shaft 22. Through-shaft 22 interacts with gear box 49 to produce a rotation of transverse shaft 23. Because drive gear 27 is attached to transverse shaft 23, drive gear 27 begins to rotate which in turn causes drive chain 26 to rotate. Drive chain 26 transfers the rotation of drive gear 27 to reduction gear 28. Because reduction gear 28 is attached to drive axle 32, drive axle 32 begins to rotate thus rotating blades 57 of reel 56.

As previously mentioned, reel 56 may be adjusted to alter the distance which spokes 58 project through the interengagement cutouts 67 of ground contact plate 62 to adjust the depth of penetration of said spokes 58 into the ground.

Through-shaft 22 continues through gear box 24 in forward carriage 30 to connect to rear intermediate shaft 117 through universal joint 118. Rear intermediate shaft 117 then connects with the rear-through shaft 122 through universal joint 119. Through-shaft 122 then acts, as does the entire rear reel carriage 80, in the manner identical to forward reel carriage 30, although, as noted above in the preferred embodiment, rear blade reel 56 rotates in the opposite direction to forward reel 56. It should be noted that the implement 10 may be employed by using only one of carriages 30 or 80 as desired.

Figure 5:
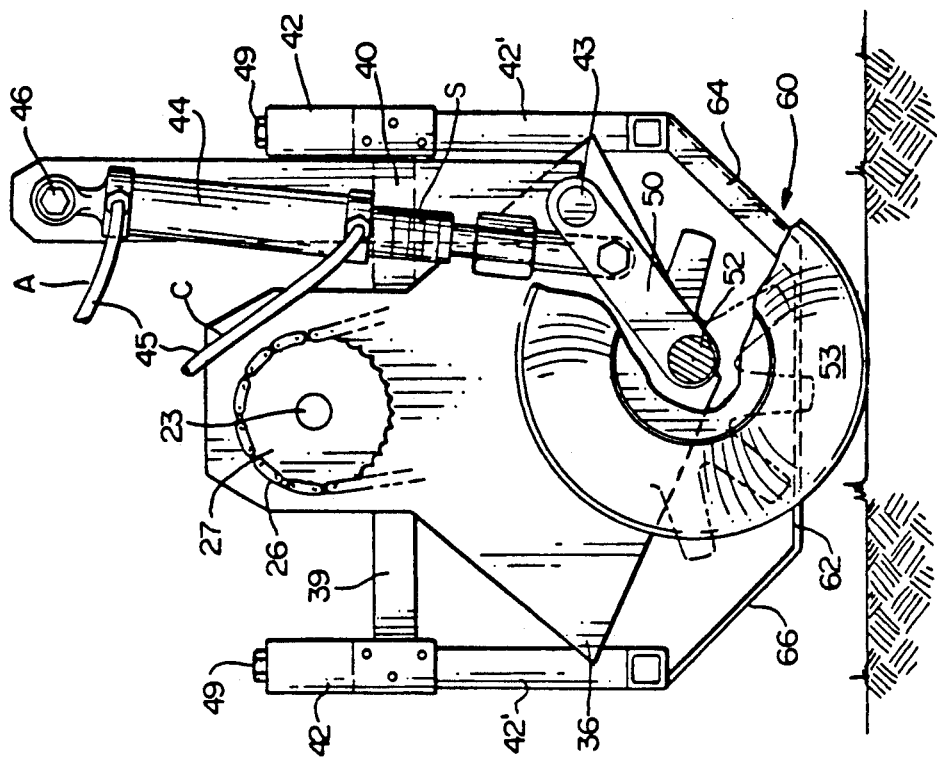
FIG. 5 is another side elevational view of the invention of FIG. 1 taken along lines 4—4 of FIG. 3, but where the hydraulic arm (44) is in the extended or non-use position.
Figure 4:
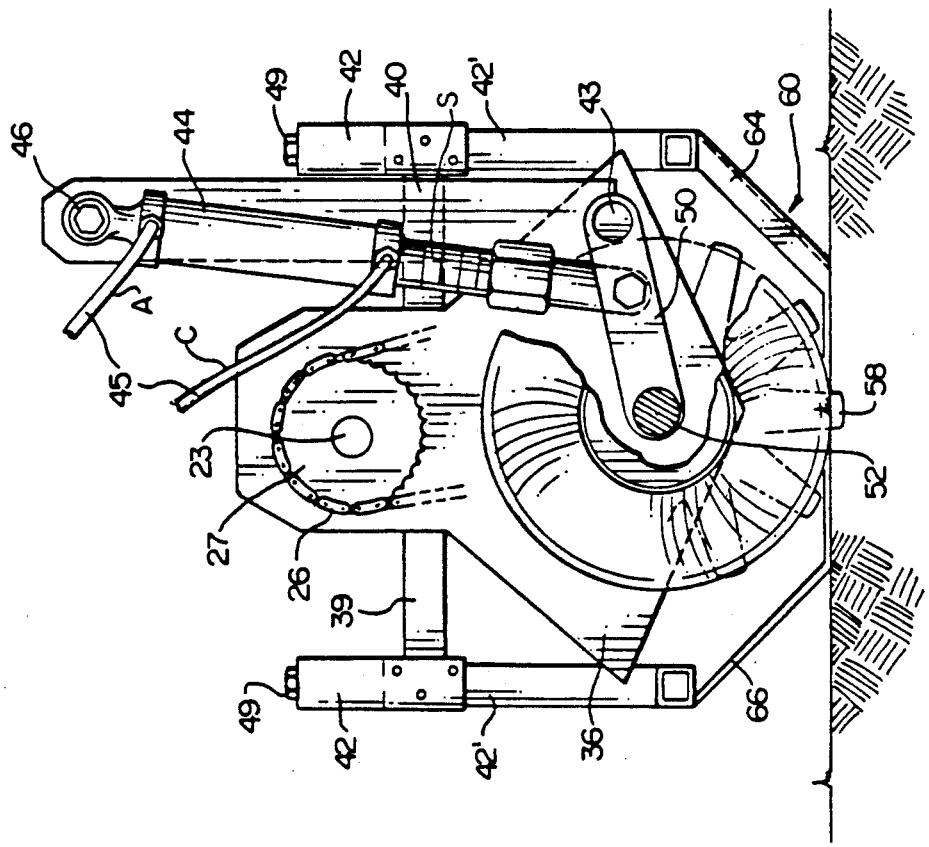
FIG. 4 is a side elevational view of forward carriage (30) taken along lines 4—4 of FIG. 3.

It should also be noted that space's S associated with hydraulic ram 44 and shown in FIGS. 2, 4, 5, 9 and elsewhere serve the purpose of limiting the range of movement of wheels 53 relative to carriages 30 and 80. Said spacers may be used in various combinations to select the range of movement desired. As can be seen in FIGS. 4 and 5, removal of all said spacers S will permit wheels 53 to be removed from contact with the ground upon the introduction of a sufficient quantity of hydraulic fluid to ram 44 through hydraulic line C.

Figure 10:
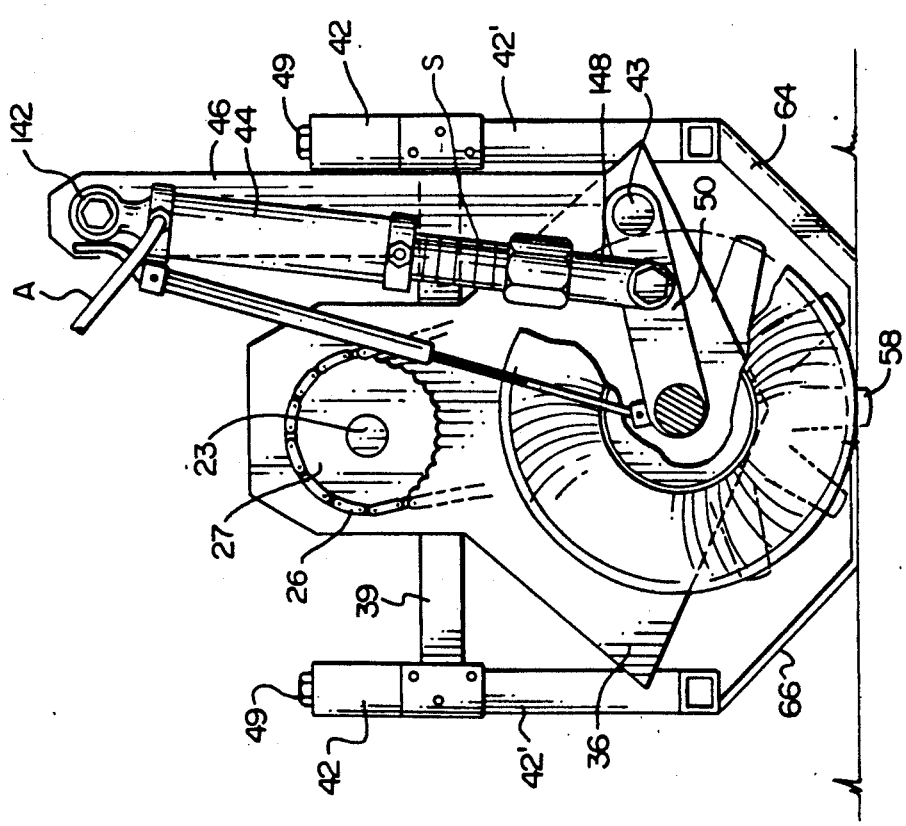
FIG. 10 is a side elevational view of forward carriage (30) in an alternative embodiment.

Shown in FIG. 10 is an alternative embodiment adapted to maintain the slight downward force against wheels 53 and hence improve traction and stability of implement 10 on slopes. The improvement is comprised of a damper 140 connected at its upper end to upper damper mounting flange 142 of hydraulic ram lift support 46 and at its lower end to link 50 in the vicinity of spindle 52. Damper 140 maintains a biasing force against link 50 in the vicinity of spindle 52 which is transferred through link 50, axle 53 and link 50 on the opposite side of that shown in FIG. 10 so as to provide said slight downward force against either wheel 53 and assure improved traction regardless of which side of the implement 10 is on the down slope of the terrain being cultivated. It should be noted that the downward force provided by damper 140 should be less than the weight of the carriage 30 or 80 and related componetry.

In this embodiment, lower hydraulic line C may be removed and replaced with an air bleed valve. In such case, the damper 140 should be a bi-directional type unit which maintains a preferred static bias which therefore tends to maintain the position of carriage 30 relative to wheels 53 constant against either upward or downward forces exerted on carriage 30.

Figure 11:
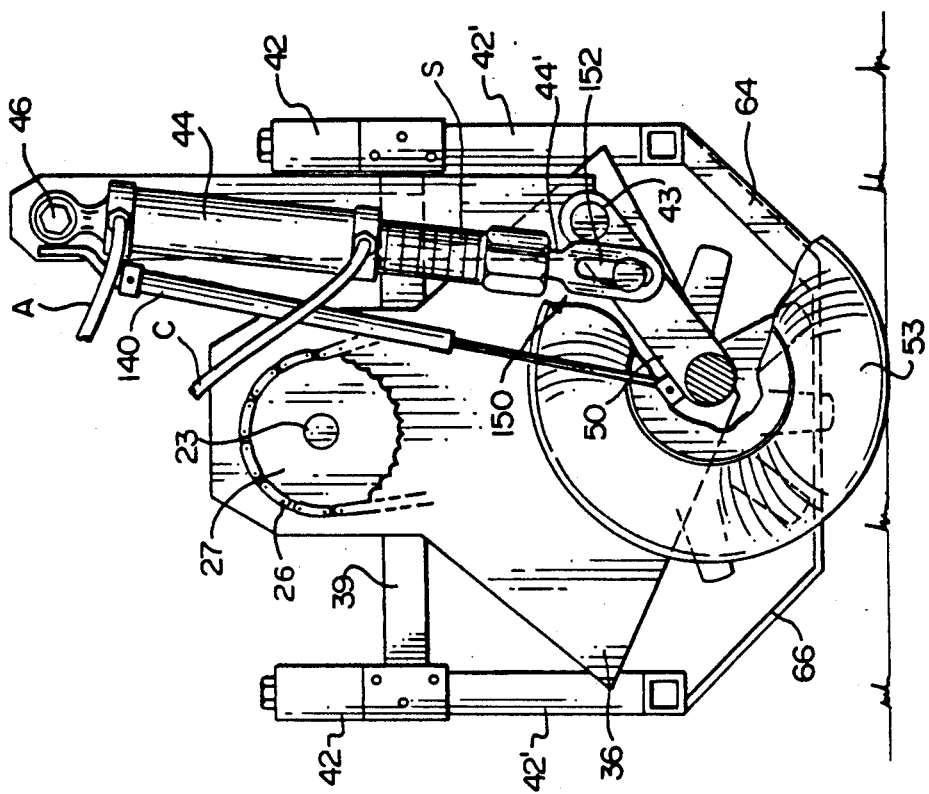
FIG. 11 is another side elevational view of the alternative embodiment shown in FIG. 10, but where the hydraulic arm (44) is in the extended or non-use position.

A further improvement to the invention, illustrated in FIG. 11, comprises utilization of damper 140 as disclosed. Lower hydraulic line C is preferably maintained in this embodiment. However, lower hydraulic cylinder mount yoke 148 shown in FIG. 10, is substituted with a sliding yoke 150. This permits link 50 to move upwardly and downwardly within track 152 of yoke arm 44'.

Yoke arm 44' is connected to hydraulic ram 44 in like manner to the connection of yoke 148 to said ram 44 and FIG. 10. This configuration allows link 50 to travel and absorb surface undulations transferred through wheels 53, the amplitude of said undulations being damped by damper 140.

Figure 12:
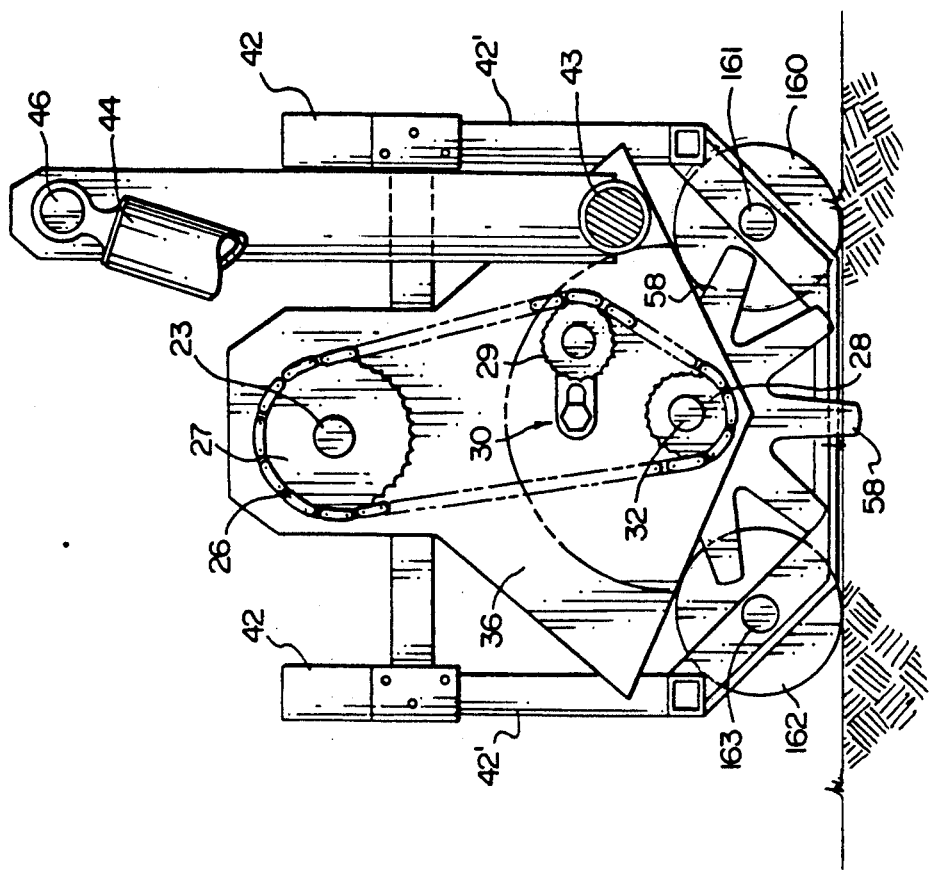
FIG. 12 shows a side elevational cut-away view of a second alternative embodiment of the instant invention.

FIG. 12 shows an alternative embodiment comprised of a pair of rotatable wheel members 160 and 162 connected to front sled member 64 of skid 60 and skid trailing member 66, respectively, through wheel bearings 161 and 163. These wheels are utilized to reduce the friction contact between the ground being cultivated and ground contact plate 62.

The instant invention has been described in what is considered to be the best embodiment. However, this description has been given by means of example, and not by means of limitation. Consequently, obvious changes or modifications could be made within the scope of this invention which would be obvious to those skilled in the art. With these considerations in mind.

What is claimed is:

1. A cultivating device to be towed behind a vehicle comprising:
    (a) a pair of reels, each held in its own carriage wherein said reels adapted to rotate in opposite directions;
    (b) means for rotating each of said reels comprising:
        (i) a rotatable shaft connected to a power supply means on said towing vehicle;
        (ii) a means for converting rotation of said rotatable shaft to rotation of said reels;
    (c) means for positioning each of said reels relative to the ground comprising skid plates placed adjacent to said reels, said skid plates defining cutouts so that blade means for thatching the ground on said reels protrude partially through said skid plates;
    (d) means for adjusting the relative positions of said skid plates and said reels;
    (e) means for hingedly interconnecting said carriages in series and for hingedly connecting the more forward of said carriages to said vehicle; and
    (f) means for raising and lowering said reels and said skid plates relative to the ground so that said reels and said skid plates may be raised off of the ground during transport to and from a work site, said means for raising and lowering said reels and said skid plates allowing said reels and said skid plates to be adjusted in vertical height relative to the ground.

2. The device of claim 1 wherein said means for raising and lowering said reels includes hydraulic means.

3. The device of claim 2 wherein said hydraulic means are operator controlled.

4. The device of claim 1 wherein said blade means includes a plurality of parallel vertical coaxial blades arranged coaxially on a rotatable axle.

5. The device of claim 4 wherein said blade means are arranged in a helical pattern when viewed along said rotatable axle.

6. The device of claim 4 wherein said blade means are arranged in a random pattern when viewed along said rotatable axle.

* * * * *